Patented Oct. 29, 1935

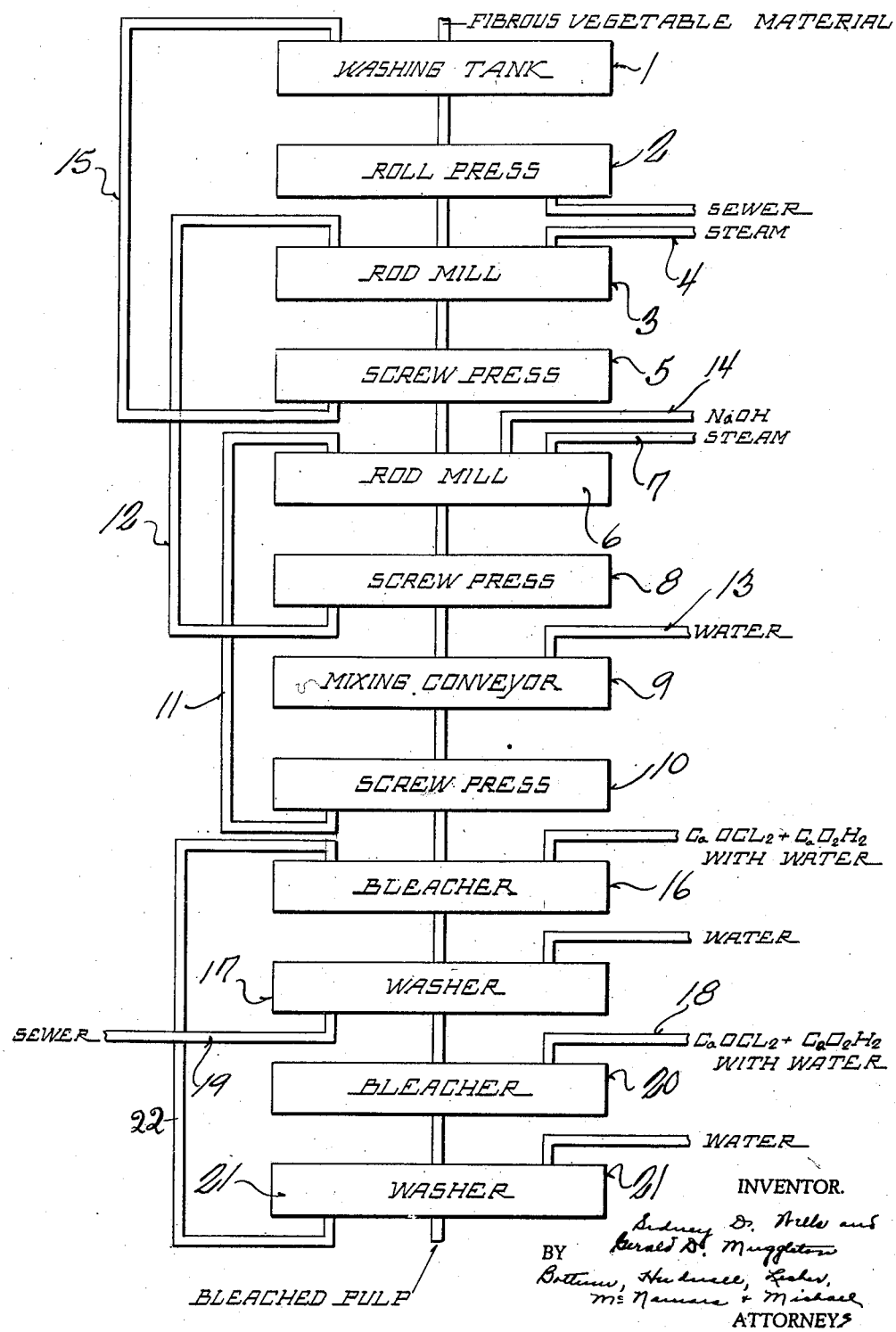

2,018,937

UNITED STATES PATENT OFFICE 2,018,937

PAPER PULP AND METHOD OF MAKING THE SAME

Sidney D. Wells and Gerald D. Muggleton, Appleton, Wis., assignors to Lewis L. Alsted, Appleton, Wis.

Application December 10, 1932, Serial No. 646,588

5 Claims. (Cl. 92—6)

This invention relates generally to a method of producing paper pulp and is particularly advantageous when used to convert fibrous vegetable material into paper pulp.

With the present invention corn stalks, cereal straws, flax straw, bamboo, bagasse, and the stalks, stems and leaves of similar annual plants may be manufactured into paper pulp which not only has the felting, sheet forming and printing properties and strength but also the color to render it appropriate for use as newsprint or as the paper making up mail order house catalogs, telephone directories, and the like. The invention is not, however, restricted to the utilization of such material and this is particularly true of certain features thereof, the invention being capable of advantageous use in connection with waste paper stock for the discharge or removal of printing ink or coloring matter, for the purification of waste paper stock and for treatment of partially digested wood chips, wood waste or other similar material.

In Patent 1,654,624, granted January 3, 1928 to S. D. Wells for a Process for separating vegetable fibrous material, there is disclosed the use of a rod mill for the purpose of producing paper pulp from material which has been given a preliminary mild digestion. In Patent 1,769,811, granted July 1, 1930 to S. D. Wells for Process for pulping fibrous material, paper pulp is prepared by treating the material with caustic soda and the material so treated is afterwards subjected to treatment in a rod mill at elevated temperatures for the purpose of removing or consuming all traces of the caustic soda.

Certain features of the present invention are based upon the discovery that it is possible to dispense with the preliminary digestion or soaking of the fibrous material before the treatment with the rods in the rod mill and that results at least equal to those obtained with both of the proposed prior processes may be obained by eliminating the preliminary soaking and subjecting the fibrous material within a rod mill to the simultaneous action of three agencies, that is, to the beating, pounding and rubbing action of the rods in the rod mill, to the digestive action of a cooking liquor and to the action of steam.

The present invention proposes the use of a rod mill as a continuous digester and develops in it not only its highest efficiency as a mixing device but also its capacity for the efficient transmission of heat from a heating medium such as steam to the mass of fibrous material. On account of the rotation of the mill and the tumbling of the rods exceptionally uniform mixing is obtained and as the drum or cylinder of the mill rotates its inner surface continuously presents fresh wet surfaces which rapidly condense the steam blown into the interior of the drum. This rapid condensation of the steam provides for the efficient transmission of the heat from the steam as a vapor to the mass of fibrous material and cooking liquor whereby the contents of the mill are heated to approximately the boiling point of the liquid at whatever pressure may exist in the mill. Operation of an open mill at approximately the boiling point of the cooking liquor at atmospheric pressures is carried out by virtue of this rapid condensation of the steam; no pressure above atmospheric is created and consequently there is no blowing of the steam out of the mill into the surrounding space.

In practice, the invention proposes a preliminary washing of the fibrous material to remove soil, vegetable dust and other undesirable non-fibrous foreign matter therefrom. It may then be pressed or crushed and afterwards it is fed into the rod mill wherein it is subjected to the pounding, beating and rubbing action of the rods, to the action of the caustic soda or other cooking liquor and to the action of the heat resulting from the condensation of the steam which is blown into the rod mill. This process may be amplified by next passing the material through a screw press and, if desired, the material may be again subjected to the action of the rods, a cooking liquor and steam in a second rod mill following which it is carried through a series of screw presses and mixing conveyors and then subjected to a suitable bleaching action and a final washing. Any conventional bleaching may be carried out in connection with certain classes of material but in producing paper pulp from annual plants such as corn stalks, cereal stalks, flax straw, bamboo, bagasse, and the like, superior results and a higher yield may be obtained by utilizing the special bleaching process proposed by the present invention.

In all previous attempts to produce a paper pulp suitable for use as newsprint or the like from fibrous material of the nature of annual plants it has been considered necessary to remove substantially all of the non-cellulose material including the pentosans and lignin in order to produce a pulp of an appropriate color. Such pulp need not be pure white but it is essential that the color be as light as that obtained from spruce. Of the woods, spruce is the only species suitable since it is the only one that will produce the desired color and for this reason it is growing in scarcity and increasing in price. All pulps produced from wood by cooking with the old established processes must be relatively low in non-cellulose constituents to be light in color or capable of being made white by bleaching. An analysis of the more important species used in pulp manufacture, standard pulps produced therefrom and of important straws and the pulped material produced therefrom by heating with rods in the presence of caustic soda dissolved in hot water is given below in percent:

|  | Pentosans | Lignin | Cellulose |
| --- | --- | --- | --- |
| Sprucewood | 15 | 28 | 48 |
| Sulphite pulp | 5 | 2 | 88 |
| Sulphate pulp | 10 | 3 | 86 |
| Aspen wood | 28 | 23 | 47 |
| Soda pulp | 15 | 1.5 | 82 |
| Corn stalks | 30 | 28 | 39 |
| Pulp | 26 | 18 | 53 |
| Wheat straw | 26 | 26 | 40 |
| Pulp | 28 | 14 | 52 |
| Bleached pulp | 25 | 10 | 60 |
| Flax straw | 28 | 22 | 58 |
| Pulp | 30 | 24 | 43 |

An examination of the figures given in the foregoing table show that in the case of standard wood pulps the cellulose content is always above 80%, the lignin content below 4% and the pentosans content 15% or below. In the case of the special pulps obtained from annual plants, the cellulose content is 60% or below, the lignin content 10% or above, and the pentosans content 25% or above. It is evident that the fibrous material provided by the annual plants is an entirely different class of material and that the processes applicable to wood pulps are not necessarily applicable to all fibrous material or to the fibrous material provided by the annual plants mentioned. We have found that by bleaching the fibrous material of annual plants with methods considered standard for wood pulps that the losses encountered in bleaching to a pure white or to a color approximating that of suitable ground wood pulp are so great as to render the product more costly than mechanical pulp and also the pulp produced purer than necessary. This is believed to be due to the fact that all prior bleaching processes are primarily purification processes designed to remove practically all of the non-cellulose constituents with as little damage as possible to the fiber insofar as its physical strength is concerned. We have discovered that all bleaching steps heretofore proposed in the art are either only alkaline in character for the first portion of the reaction but at some stage of the operation at least are dominated by acid treatments which tend to discolor the non-cellulose constituents unless carried to the extent to remove them. We have found that in the case of pulps high in lignin and pentosans that by maintaining an excess of alkalinity throughout the bleaching operation as, for example, by the addition of calcium hydroxide or some other suitable alkali as the alkalinity is diminished by the generation of carbon dioxide, the lignin and pentosans present in the pulps are not removed and that a white pulp containing 20% or more of pentosans and 10% or more of lignin in addition to the cellulose is obtained. White pulps which may be manufactured into paper suitable for printing are obtained and the yields are in excess of 60% of the dry weight of the original material and in fact may be as high as 75%.

The proper alkalinity to be maintained during the bleaching operation is shown by the use of phenolphthalein indicator. At the start of the bleaching a drop or two of the solution of the indicator dropped onto the pulp will turn pink momentarily as the bleaching progresses. However, it will be found that the depth of color obtained by dropping additional drops will be successively less until there will be no color formed at all unless $CaO_2H_2$ or some other alkali such as caustic soda, soda ash, barium hydroxide, or the like, are added in sufficient amounts to restore the alkalinity. It is understood, of course, that the pulp in the bleacher is being effectively stirred, turned over, and circulated.

Not only are the pulps obtained by the methods disclosed merely capable of substitution for more expensive wood pulps, but on account of the high pentosan content they impart snap, rattle, strength, filler retention, and other qualities so that better papers can be made at the same cost. The high pith content of some of the materials also make possible much more closely grained and smoother printing surfaces.

Description of tests for determining the amounts of cellulose, lignin and pentosan are given in Patent No. 1,859,848, issued May 24, 1932, to John D. Rue, Sidney D. Wells and Francis G. Rawling, and also in Patent No. 1,654,624, issued January 3, 1928, to Sidney D. Wells.

In the drawing, the figure represents diagrammatically an apparatus which may be employed for carrying out the methods proposed by the present invention.

Referring to the drawing, it will be seen that the fibrous vegetable material is supplied in any suitable fashion to a washing tank 1 which may consist simply of a long tank of water provided with immersing means and which functions to wash the material free from soil, vegetable dust and other undesirable non-fibrous foreign matter thereon. The material may be charged into one end of the washing tank on a suitable conveyor and discharged therefrom at the other end by the same conveyor which may be submerged in the water of the tank and which, at its discharge end, feeds the material into a pressing arrangement designated generally at 2 and which may consist of a two-roll crusher and a three-roll cane press of the type used in cane sugar mills. The dirty water expressed from the material by the pressing arrangement 2 may be run into a sewer or, if desired, may be properly treated for the recovery of the soluble carbohydrates and proteins removed from the raw material and which may be used for stock feed. Fresh water may be supplied to the washing tank to maintain the desired water level therein or, if desired, spent liquor from subsequent pressing and washing operations may be introduced into the washing tank, if this is desirable from the standpoint of economy or to avoid stream pollution. The crushed material is delivered from the pressing arrangement 2 to a rod mill 3. A partially spent caustic liquor, as, for example, a solution of caustic soda, is run into the rod mill 3 from a subsequent operation so that the crushed material is immersed in this caustic liquor while being subjected to the beating, pounding and rubbing action of the freely falling rods during the operation of the rod mill. The action of the rods tends to disintegrate the crushed fibrous material while the caustic liquor tends to digest the same and both actions are facilitated and enhanced by blowing steam into the interior of the rod mill from a steam line 4. When the rod mill is in operation its drum or cylinder is rotated and the rods, of course, freely fall and tumble therein. The steam admitted is rapidly condensed due to the continuous presentation of fresh wet surfaces and due to this rapid condensation of the steam and the consequent efficient transmission of its heat to the contents of the mill these contents may be heated to approximately the boiling point of the caustic liquor at whatever pressure that may exist in the mill. Operation of the mill with the caustic liquor heated to its boiling point at atmospheric pressure may be carried on and preferably is because the rapid condensation of the steam precludes a raise in pressure and prevents escape and blowing of the steam out of the mill to the exterior. The pulp material emerging from the rod mill 3 is conveyed in any suitable way to a screw press 5 where the water content is reduced from approximately six parts of water to one part of fiber to approximately two parts of water to one of fiber. The rod mills, screw presses and mixing conveyors are preferably of the type illustrated and described more in detail in the application of Sidney D. Wells, filed June 29, 1932, Serial No. 619,863, for Apparatus for and method of removing printing ink from paper, and reference is made to such application for a more detailed disclosure of these instrumentalities.

From the screw press the material is conveyed in any suitable manner to a second rod mill 6 wherein it is treated with a fresh caustic soda solution containing about 5% of caustic soda based on the dry weight of the fiber. It is also subjected to the action of the freely falling rods in the second rod mill and to the action of heat resulting from the blowing of steam into the rod mill from the steam line 7. Sufficient steam is admitted to maintain the temperature at a point between 90° and 100° C.

The pulp leaving the second rod mill 7 is conveyed to a screw press 8, thence to a mixing conveyor 9 and thence to a second screw press 10 wherein it is washed in a counter-current fashion, the effluent from the screw press 10 being carried back through a suitable conduit or pipe line 11 to the second rod mill 6 and being mixed with the stock therein. The effluent from the screw press 8 is carried back through a pipe line 12 to the first rod mill 3. Water is supplied through a supply line 13 to the mixing conveyor 9. The fresh caustic soda solution supplied to the second rod mill 6 may be conveyed through a pipe line 14. The effluent from the first screw press 5 may be carried back through a pipe line 15 to the washing tank 1 where it is desired to use spent liquor for the washing operation.

The stock leaving the screw press 10 is conveyed to a bleacher 16 preferably of the high density type and is bleached in said bleacher for about four hours with about 15% of hypochlorite (35% av. Cl). During the bleaching operation an excess of alkalinity is maintained by the addition of a suitable alkali such as calcium hydroxide, caustic soda, soda ash, barium hydroxide, or the like. After bleaching, the material is washed in a suitable washer designated at 17 supplied with water from a pipe 18, and also equipped with an outlet 19 leading to the sewer or other point of discharge. The washer 17 may be and preferably is of the vacuum drum filter type. After washing the material is preferably again bleached in a second bleacher 20 by means of 5% solution of hypochlorite with an excess of alkalinity still maintained by the addition of a suitable alkali. After the second bleaching the material is again washed in a second washer 21 and is then ready for admixture in substantial portions with other pulp in the manufacture of printing or other types of paper or board where a white color and a snappy product is desired. The effluent from the second washer 21 is carried back through a pipe connection 22 to the bleacher 16 so that the counter-current effect is had in bleaching as well as in the pulping.

The high content of pentosan makes the pulps prepared in this way particularly advantageous for imparting the effect of hydration, rattle, strength, and the like, to mixtures in which such pulps are used. The high pentosan content is further advantageous in that it increases the capacity of the paper to retain fillers, sizing material and the like, and makes possible particularly close grained and smooth surfaced paper. Effective control of the desired characteristics is possible and practical by proper proportioning of the ratio of these pulps to other pulps and fillers used in the furnish.

While we have shown and described typical methods of carrying out our invention it is to be understood that the examples selected are merely for the purposes of illustration and that various changes, which will readily suggest themselves to those skilled in the art, may be made without departing from the spirit of the invention or the scope of the subjoined claims.

The invention claimed is:

1. A substantially white bleached fibrous material containing not less than 20% of pentosans and not less than 10% of lignin with the remainder substantially cellulose.

2. The hereindescribed method of producing paper pulp from fibrous vegetable material which consists in washing the material to free it from non-fibrous foreign matter, crushing the washed material in a rod mill and digesting and disintegrating the material in a cooking liquor obtained in part by forcible removal from the pulp later in the process, blowing steam into the rod mill during the digesting and disintegrating action, thereafter washing the material counter-currently and finally bleaching the material while maintaining the mass alkaline throughout the bleaching operation so as to preclude chlorination of the lignin.

3. The hereindescribed method of producing bleached pulp containing not less than 20% of pentosans and not less than 10% of lignin from the fibrous vegetable material of annual plants, which method consists in simultaneously disintegrating and cooking the material in a cooking liquor within a rod mill, blowing steam into the rod mill to maintain the cooking liquor at a temperature near its boiling point and at atmospheric pressure, separating the disintegrated and cooked material from the liquor and then subjecting the material to the action of a bleaching agent while maintaining the alkalinity of the mass throughout the bleaching operation.

4. The hereindescribed method of producing bleached pulp containing a substantial amount of pentosans and lignin from fibrous vegetable material, which method consists in cooking and disintegrating the material in a rod mill at an elevated temperature, and thereafter subjecting the material to the action of a bleaching agent while maintaining the alkalinity of the mass throughout the bleaching operation, whereby to brighten the pentosans and lignins while retaining a substantial amount thereof in the resulting pulp.

5. The hereindescribed method of producing bleached pulp containing not less than 20% of pentosans and not less than 10% of lignin from fibrous vegetable material, which method consists in cooking and disintegrating the material in a rod mill at an elevated temperature, and thereafter subjecting the material to the action of a hypochlorite bleaching agent while adding sufficient alkali throughout the bleaching operation to maintain the alkalinity of the mass.

GERALD D. MUGGLETON.
SIDNEY D. WELLS.